Patented Sept. 23, 1924.

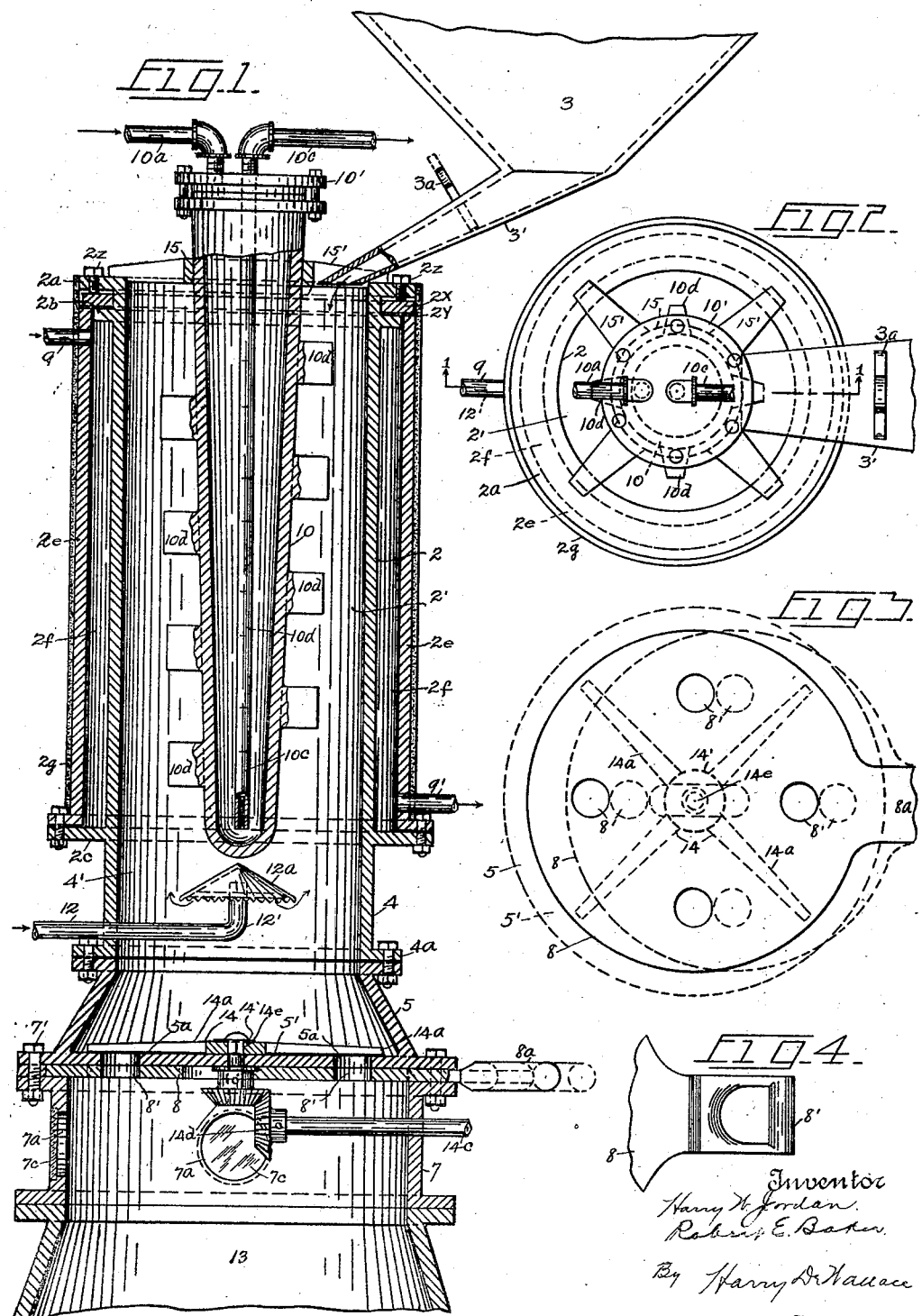

1,509,280

UNITED STATES PATENT OFFICE.

ROBERT E. BAKER, OF PITTSBURGH, PENNSYLVANIA, AND HARRY W. JORDAN, OF SYRACUSE, NEW YORK.

APPARATUS FOR TREATING GRAINS AND ORGANIC MATTER.

Application filed September 13, 1923. Serial No. 662,586.

*To all whom it may concern:*

Be it known that we, ROBERT E. BAKER and HARRY W. JORDAN, citizens of the United States, residing, respectively, at Pittsburgh, county of Allegheny, and State of Pennsylvania, and Syracuse, in the county of Onondaga and State of New York, have invented certain new and useful Improvements in Apparatus for Treating Grains and Organic Matter, of which the following is a specification.

This invention relates to an apparatus, having for its particular object to treat various grains, such as wheat, corn, barley, oats, and the like, by subjecting the grains to a process of heating and aerating, for the purpose of destroying or sterilizing the eggs of certain insects, such for example, as the indian-meal or grain moths (Tineidæ and Butalis), which in the past have proven destructive to stored grains, as well as to the manufactured products of the grains. A further object is to provide an upright hollow cylindrical body, into which the grain may be poured in measured quantities by any suitable means. A further object is to provide means for heating the main cylinder, by circulating through the chambered walls thereof, steam, hot water, or other hot fluid, for heating the grain to any desired temperature, as it gravitates through the cylinder. A further object is to provide an auxiliary heater comprising a smaller upright hollow body, which is disposed concentrically in the grain chamber of the main cylinder, and which is preferably heated by passing therethrough a similar heating fluid; the auxiliary heater being surrounded by the grain and supplementing the heat of the main cylinder. A further object is to provide a base for supporting the heaters, the said base being hollow and its bottom portion comprising a chamber which receives the heated grain as it gravitates from the main cylinder; while the top-portion of said base constitutes an air-chamber, which is arranged to be supplied with heated air that filters upwardly through the column of grain, and absorbs and carries off the moisture liberated from the grain, through the open top of the main cylinder. A further object is to provide a valve for controlling the discharge of the heated grain from the base into a storage or other bin, and for regulating the speed of such discharge. And a further object is to provide an agitator for insuring constant feeding of the grain towards and through the controlling discharge valve.

We attain these objects by the means set forth in the detailed description which follows, and as illustrated by the accompanying drawing, in which—

Figure 1 is a central vertical section, taken on line 1—1 of Fig. 2. Fig. 2 is a top-plan view of the apparatus. Fig. 3 is a top-face view of the valve mechanism and agitator. And Fig. 4 is a fragmentary view of the handle by which the valve is operated.

All grains and organic products are more or less subject to the depredations of certain insects, as well as fungus growths. The insects usually lay their eggs while the grains and plants are growing; hatching the eggs produces the larvæ of the species, which devour the plants and products. The eggs of such insects, as a rule, are not affected by low temperatures, neither are they destroyed by grinding the grain, inasmuch as the larvæ, during their feeding and growth periods, are frequently found in the flour or meal that results from grinding the grain. Furthermore, the eggs of the grain or indian-meal moths, for example, are rarely destroyed by the threshing and storage of the grains, nor by the temporary heating of the grain during the sweating periods common to most cereals in storage.

It has been found by experiments that when the eggs of moths, or spores of the fungus referred to are subjected to a relatively high temperature, for a definite period, that the eggs or fungus are rendered sterile, and that the grain or other products may then be ground or otherwise prepared for food or other uses, with prefect safety, and with assurance that all insect or fungus life has been effectully destroyed. The temperatures required to render the eggs or spores sterile may be stated as falling between 125° and 150° Fahrenheit. That is to say, the infected grain or other material should be subjected to temperatures within the said range for a duration of about one hour, depending upon the texture and physical character of the material treated, and the resistance of the particular infecting medium encountered.

After treatment, the grain or other material is allowed to be stored or used. A detailed description of our invention follows:

In the drawing, 2 represents a hollow upright cylinder, open at both ends for the reception and discharge of grain and other products to be heated within the relatively spacious chamber 2'. The grain may be delivered to the cylinder from any suitable storage bin, as 3, by a spout 3', and the feed of the grain may be regulated by a valve or damper 3$^a$. The cylinder 2 has a top flange 2$^a$, and below said flange a rib 2$^b$. Near its bottom cylinder 2 is provided with a flange 2$^c$, below which is a hollow extension 4, whose lower end is provided with a flange 4$^a$. The cylinder 2—4 is supported directly by a hollow truncated base 5, which rests upon a hollow cylindrical support 7, the meeting ends of the base and support having corresponding flanges, and being secured by bolts 7'. The bottom end of the base is closed by a floor 5', which is provided with a number of perforations 5$^a$, through which the grain is discharged from the superposed heating unit into the support 7. 8 represents a flat disc-shaped valve, which is slidably mounted beneath the floor 5'. The disc is provided with similar perforations 8', which are arranged to register with the openings 5$^a$, when the valve is in the full line position, shown in Figs. 1 and 3, for the discharge of the grain from the base. The valve 8 is operable by means of a handle 8$^a$, which is secured to a laterally projecting arm 8$^c$ of the disc. The rate of discharge of the heated grain through the floor 5' may be varied by moving the valve 8 horizontally, as shown by the full and dotted lines in Figs. 1 and 3.

The cylinder 2 is surrounded by a larger loosely fitting cylinder 2$^e$, for providing a cylindrical chamber 2$^f$, which contains the heating fluid, such as steam, or hot-water; the said fluid being delivered to the top of the chamber 2$^f$ by a pipe 9; while the exhaust, as well as the water of condensation escapes through a pipe 9', which taps the cylinder 2$^e$ near its bottom. In case hot-water or other fluid is used, the direction of flow may be reversed. By this construction and arrangement, the column of grain held by the cylinder 2 is uniformly heated throughout its length, and the steam or other fluid is afforded the proper circulation for maintaining a steady heat. The bottom end of the exterior cylinder 2$^e$ is provided with a flange, which is bolted to the flange 2$^c$ of cylinder 2. The cylinder 2$^e$ is shorter than cylinder 2, and the opening between said cylinders is closed and sealed by a ring 2$^x$ and a packing 2$^y$, the said ring being held in place by bolts 2$^z$.

In order to more effectually, as well as more rapidly heat the grain in the chamber 2', we provide an auxiliary heating element, which preferably consists of an independent hollow cone 10, of somewhat smaller diameter, which is preferably disposed in the line of the longitudinal axis of the main cylinder. The opposite ends of the cylinder 10 are closed, the top end preferably being flanged and closed by a cap 10', and this end of said member preferably extends a considerable distance above cylinders 2—2$^e$, as shown. The cap 10' is tapped, and fitted with a steam pipe 10$^a$, and also with a centrally disposed exhaust pipe 10$^c$, by which the waste steam and water of condensation may be carried away. The bottom end of pipe 10$^c$ is preferably spaced an inch or two from the bottom of member 10. The member 10 preferably extends substantially the full length of the main cylinder 2, and heats the central portion of the column of grain. The member 10 is preferably tapering for facilitating the gravitation of the grain, and is provided with a number of radial heat-conducting fins or spurs 10$^d$, which supplement the heating of the parts 2—10 and increase the heating action, the said fins preferably being staggered for more effectually distributing their heat, as well as for lessening the tendency of the grain to become clogged in the main chamber 2'. As a rule, stored grains contain more or less moisture, that should be eliminated in order to render our treatment most effective, as well as to properly dry the grain for grinding. Ordinarily, heating the grain while it gravitates through the chamber 2' tends to dissipate this excess moisture, but owing to the relatively great depth and bulk of the column contained in said chamber, more or less of the excess moisture might remain after the grain has been discharged from the heating unit. To overcome this defect, we provide simple means comprising a pipe 12, which delivers heated air under pressure into the chamber 4' of the extension, and discharges the air through an upturned nozzle 12', beneath an inverted cone-shaped baffle 12$^a$, from which the air escapes around the serrated mouth of the baffle in all directions, and thence filters upwardly through the grain in chamber 2'. By supplying the air under pressure, and the air being heated, it naturally tends to flow upwardly, and in passing through the grain, not only tends to absorb and carry with it, whatever moisture may be liberated by the primary heating parts, but also tends to supplement the heat of the cylinders 2—10. The top of the main cylinder being normally open, the moisture-laden air readily escapes to the atmosphere at that point. The speed at which the grain may gravitate through the chambers 2' and 4' may be regulated by the adjustment of the valve 8. It is an object of the present invention to suitably retard the gravitation of the grain, by means of the valve 8, so as to prolong the heating of the grain sufficiently to effectively start the sterilization and destruction of the insect eggs or fungus, that may have been deposited upon or within the kernels of the grain. The major part of the sterilization, however, preferably is effected by storage of the heated grain in a suitable bin 13, where the grain is collected as it falls from the sterilizer, in which bin it is held at a temperature and for a time sufficient to insure complete sterilization. It will be understood, however, that the entire process of destroying the insect or fungus life may be accomplished before the grain passes through the valve 8. In general practice we prefer to bring the grain to a proper temperature as quickly as possible while it is within the main heater 2, and then discharge the properly heated grain into a receiving bin of such capacity that the heater may be operated continuously for handling relatively large volumes of grain in a comparatively short period of time. This may be accomplished by suitably adjusting the damper 8 for effecting a constant copious discharge of the grain through the openings 5ª and 8' towards the storage bin 13. By the preferred mode of operation, the grain enters the storage bin at a temperature in excess of the minimum required to effectually sterilize and destroy the egg-germs, and the said bin being preferably tightly sealed, the process of sterilization continues in the bin until complete, without causing delay or stoppage of the primary heating unit.

In order to insure the steady discharge of the grain through the holes of the damper 8, which regulate the rate of discharge, we provide a rotary agitator 14, which comprises a central body 14', from which radiate a number of spokes or arms 14ª, that sweep the top surface of the floor 5' of the base, and thereby prevent the grain from arching and stopping its gravitation. This revolving member also tends to stir the grain and prevent it from moving through the damper from channels. The agitator 14 may be driven by any suitable power, by means of a horizontal shaft 14ᶜ, bevel-gears 14ᵈ and a vertical shaft 14ᵉ, the latter shaft passing through a slot 8ᵈ of the disc 8, which permits the free operation of the valve (see Figs. 1 and 3).

The temperature in the main cylinder 2 may be lowered or raised by the opening and closing of the valve 8. That is to say, if the valve is wide open, the grain discharges at a higher rate which effects the lowering of the temperature, while partial closing of the valve tends to effect the raising of the temperature in said parts because of the slowing-down of the discharge. The temperature of the grain may be controlled or changed by varying the flow of the steam, or by a combination of these two methods.

It is desirable in an apparatus of this class that the operators be enabled to inspect the progress of the heated grain. To this end, the walls of the support 7 are apertured, as at 7ª, and the apertures are preferably closed by transparent discs 7ᶜ, through which the operators may observe the character of the flow of the grain.

In practice, our apparatus is usually heated by steam, which acts more quickly and produces higher temperatures more evenly and steadily. The lower temperatures may be obtained by the use of hot-water or other suitable heating fluids. In charging the apparatus with hot-water, the direction of flow of the water should be opposite that indicated for the steam.

By the use of our improved apparatus, the grains treated therein are restored to their natural, clean healthy condition. By heating the grain, as herein described, before the eggs of the insects are hatched, the propagation or evolution of the larvæ, which devour the grain during their feeding and growth cycle, is forestalled. Aside from the destruction or sterilization of devastating insects, eggs or fungus, heating the grain effectually dries it and thus facilitates more rapid and satisfactory grinding or reducing of the grain to flour, meal, and the like, with production of a brighter, cleaner product. The advantages of our process makes it possible to reclaim grain that has become damp, or that has sweated in storage, and to restore it to higher grade and thereby increase its market value considerably in excess of the cost of the treatment.

Obviously, other food products than those named as being derived from grains, such for example, as nut-meats that are largely employed by candy-makers and bakers, may be treated for sterilizing insects eggs and fungus growths, by controlled temperatures, in a manner similar to that herein described and shown, by slightly modifying the apparatus, or by utilizing any of the well-known shelf or chamber drying ovens, wherein trays containing the more delicate and fragile products (like nut-meats) may be placed during the sterilizing operations.

The apparatus herein shown and described, we have found to be effective. Its capacity when properly constructed and proportioned is suitable for the largest mills or plants. However, we do not wish to be limited to the precise construction and arrangement herein illustrated, but wish to include within the scope of our invention such changes or modifications as may produce the aforesaid results, i. e., the heating of grain and other products to predetermined controlled temperatures, while the grains and products are held in or passed through the apparatus, for the purpose of sterilizing or destroying insect and germ life and fungus growths, especially of grain or indian-meal moths.

Having thus described our invention, what we claim, is—

1. In a sterilizing heating unit, the combination of a main upright cylinder adapted to be filled with a column of grain, means for heating said cylinder for raising the temperature of the grain sufficiently to destroy the eggs of insects and fungus, means for effecting the gravitation of the column of grain from the cylinder at different speeds, and means for passing heated air upwardly through the grain of said column.

2. In a sterilizing heating unit, a main upright hollow cylinder adapted to be filled with grain, means for heating said cylinder, means for passing heated air upwardly through the grain in said cylinder, a valve for controlling the discharge of the grain from said cylinder, and an agitator for insuring the flow of the grain to the valve.

3. In apparatus of the character described, the combination of a main upright hollow cylinder adapted to be filled with grain, means for heating said cylinder, a hollow conical member disposed within the main cylinder, means for heating the conical member, an air-chamber below the said cylinder, means for supplying heated air to said chamber, and a damper located below the said chamber equipped to regulate the flow of the heated grain from said cylinder and said member.

4. A sterilizing heating unit, including a main cylinder open at its ends adapted to be filled with grain and other products, means for heating the walls of said cylinder, a smaller tapering member disposed concentrically within the main cylinder adapted to be charged with steam or a heating fluid for supplementing the heat of the main cylinder, means for supplying heated air for expelling moisture from the grain, and a valve adapted to control the gravitation through and beyond the main cylinder.

5. In a sterilizing heating unit, the combination of an upright hollow cylinder having hollow walls adapted to be charged with steam or other heating fluid, the interior of said cylinder adapted to be filled with grain, means for forcing heated air through said cylinder for expelling moisture from the grain and for supplementing the heat produced by said fluid, and means for effecting the movement of the grain through the cylinder at different speeds.

6. A sterilizing heating unit including an upright hollow cylinder adapted to contain a column of grain, said cylinder adapted to have heat applied to its walls for heating the grain, a conical heating element disposed concentrically in said cylinder for supplementing the heat derived from said cylinder, means for controlling the discharge of the grain from said cylinder, and an agitator for preventing clogging of the grain above the point of discharge.

7. A sterilizing apparatus including an upright hollow cylinder adapted to be filled with a product to be sterilized, means for heating the walls of the cylinder for raising the temperature of the product, an auxiliary heating element surrounded by the product and supplementing the heat radiated by said walls, means for passing heated air through said cylinder, and means for delivering the heated products to a storage receptacle.

8. A sterilizing heating unit including a main upright hollow cylinder adapted to be filled with grain, means for applying heat to the column of grain in said cylinder, means for expelling moisture from the grain, and means for effecting the movement of the grain away from said cylinder at different speeds.

9. A sterilizing heating unit including a main upright hollow cylinder adapted to be filled with grain, means for applying heat to the column of grain in said cylinder, means for expelling moisture from the grain, means for effecting the movement of the heated grain away from said cylinder, and means for agitating the grain for effecting its free movement.

10. A sterilizing heating unit including a hollow body and adapted to be filled with organic matter to be sterilized, means for heating the matter in said body, means for aerating said matter by passing heated air through said body, and means for effecting the discharge of the sterilized matter from said body at different speeds.

11. The combination of an outer cylinder and a concentric hollow member arranged to provide an annular space therebetween adapted to be filled with grain, the walls of the cylinder being insulated by an exterior lagging and the said member adapted to be charged with a heating medium for raising the temperature of the grain, and a damper below said cylinder adapted to effect the discharge of the heated grain at different speeds and for varying the temperature of the grain.

12. An apparatus of the class described, including an upright hollow cylinder adapted to be filled with grain, means for heating the walls of said cylinder, an internally heated conical member disposed in the line of the longitudinal axis of said cylinder adapted to supplement the heat radiated by said walls and to facilitate the gravitation of the grain, and a valve for effecting the downward movement of the heated grain at different speeds and for varying the temperature in the space between said cylinder and said member.

In testimony whereof we affix our signatures.

ROBERT E. BAKER,
HARRY W. JORDAN.